United States Patent [19]

King

[11] 4,092,884
[45] June 6, 1978

[54] LATHE ADAPTER FOR NON-STANDARD THREAD MACHINING

[76] Inventor: Ellwood J. King, 2750 Elmira St., Newbury Park, Calif. 91320

[21] Appl. No.: 798,724

[22] Filed: May 19, 1977

[51] Int. Cl.² .............................................. B23B 1/00
[52] U.S. Cl. ......................................................... 82/5
[58] Field of Search .............................................. 82/5

[56] References Cited

U.S. PATENT DOCUMENTS

| | | | |
|---|---|---|---|
| 1,347,789 | 7/1920 | Muller | 82/5 |
| 1,718,480 | 6/1929 | Muller | 82/5 |
| 2,492,251 | 12/1949 | Wills | 82/5 |
| 3,192,806 | 7/1965 | Bissbee et al. | 82/5 |

*Primary Examiner*—Harrison L. Hinson
*Attorney, Agent, or Firm*—Warren T. Jessup

[57] ABSTRACT

A device for modifying a lathe having predetermined standard thread settings. Primarily, it can be used to adjust the lathe for extra non-standard thread cutting. The device is comprised of an adapter which can be attached to a compound tool rest for moving longitudinally the upper block of the compound tool rest a predetermined amount relative to the carriage during the thread cutting process. A calibrated scale can be set to add or subtract up to 10% from any lead selected from the standard thread series on the lathe. Automatic drive is provided by linking the motion of the carriage being driven by the worm screw on the lathe to the adapter. The adapter is comprised of a plurality of blocks which create a moment arm for moving the upper block relative to the lower block of the compound tool rest when the carriage is being driven. The adapter is comprised of a block attached to the upper part of the compound tool rest slide having a transverse slot which is engaged by a pivot pin for producing a moment arm of predetermined length. The pivot pin sets in a socket on a regulator block which permits adjustment of the pivot pin along the transverse slot. The regulator block is slideably mounted on a lever arm which is rotatably secured to a fixed reference line on the lathe. The linkage between the lever arm and the lathe is comprised of a swivel riding on a guide bar clamped to one rail of the lathe bed. A scale on the lever arm permits the regulator block to set a moment arm length which adds or subtracts up to 10% of the value of the lead determined by the standard thread setting.

25 Claims, 13 Drawing Figures

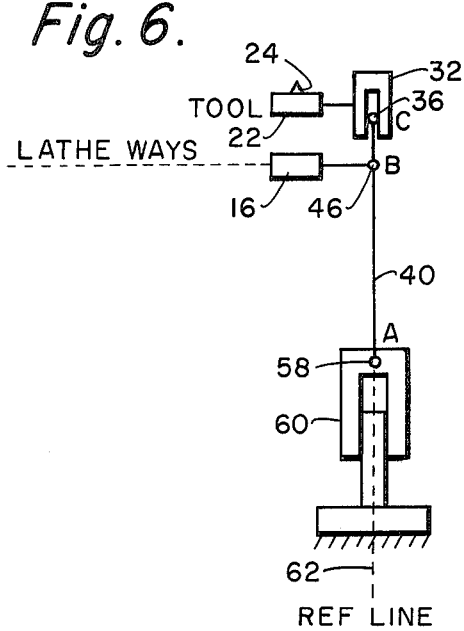
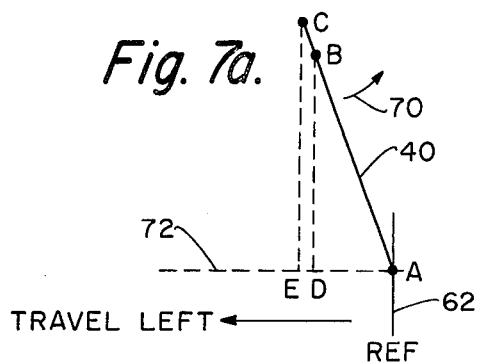
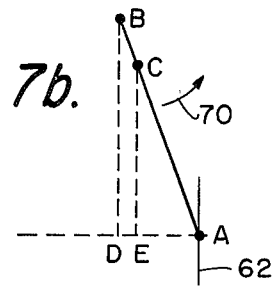
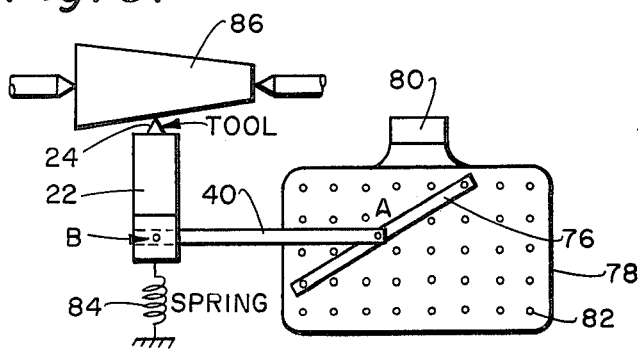
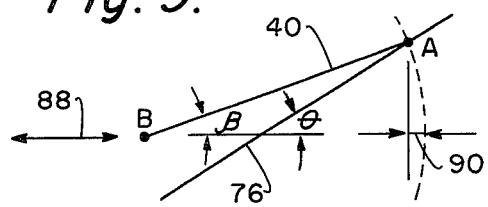
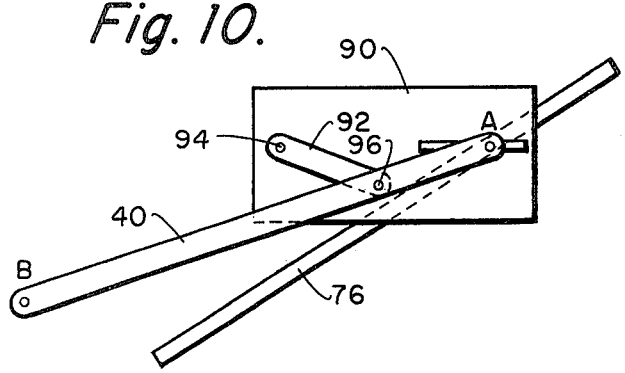
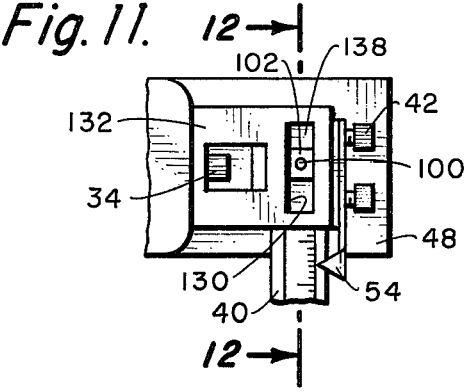
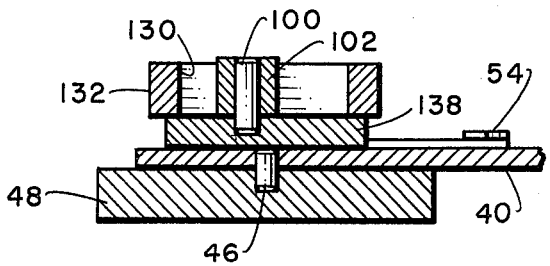

LATHE ADAPTER FOR NON-STANDARD THREAD MACHINING

BACKGROUND OF THE INVENTION

This invention relates generally to thread cutting on lathes and more particularly relates to adapters for adjusting the lathe for extra non-standard thread cutting.

In many of the lathes now used throughout industry and science, a standard setting is provided for threads from approximately four threads per inch up to 224 threads per inch, or in the case of metric lathes, from 0.075 to 5mm (millimeter) pitch. Thread settings are selected by adjusting a gear box or with change gears. When odd-size threads in between these settings are needed, there is no way known by which they can be readily machined without adding gears for each circumstance. Various devices have been invented for attachment to lathes for making a variety of machine cuts, but there are no known devices available which can be used to set the lathe for cutting non-standard threads automatically.

SUMMARY OF THE INVENTION

The purpose of the present invention, is to provide an adapter for attachment to existing lathes having standard thread settings by which the lathe can be used for cutting extra nonstandard threads.

This device is an accessory or adapter for screw cutting lathes, and possibly other machines, that makes it possible for the machine to produce threads of essentially any value (including metric, American, non-standard, etc.) over a continuous range that exceeds the normal discrete range of the machine. The device is comprised of an adapter attachable to the compound tool rest which automatically and continuously drives the upper block of the tool rest a proportional amount relative to the motion of the lower block and carriage thereby adding to or subtracting from a predetermined standard thread setting. It has been found that providing a setting of up to or minus 10% to standard thread settings covers the thread settings in between discrete values, permitting a continuous range over the thread settings of the lathe and extending beyond by 10%. That is, for thread settings of 36 and 40, adjustment of the adapter for adding 10% to 36 or subtracting 10% from 40 provides an overlap whereby any thread between these two standard settings may be cut.

The adapter is comprised of a drive block having a transverse slot detachably secured to the upper block of a compound tool rest, with a pivot pin adjustably engaging the slot. When the pivot pin is in the approximate center of the slot and is precisely coaxial with the center of rotation of an underlying lever arm, no driving motion is imparted to the upper block of the compound tool rest when the carriage is moving. With the pivot pin offset to either side of the rotational axis of the lever arm, the moment are thereby created will cause the upper block of the compound tool rest to be moved in either direction selectively and simultaneously with the motion of the carriage and the lower block of the compound tool rest. Thus, the motion of the upper block of the compound tool rest adds to or subtracts from the lead produced by the motion of the entire compound tool rest determined by the standard thread setting. The pivot pin is supported by a regulator block slideably secured to a rotatable lever arm. The regulator block, is adjusted along the lever arm to select any desired position for the pivot pin. Rotation of the lever arm causes rotation of the regulator block and the pivot pin producing a driving force for the upper block of the compound tool rest, if the pivot pin is offset from the rotational center of the lever arm. An automatic drive is provided for the lever arm by rotatably linking it to a guide arm rigidly secured to one rail of the lathe bed. Thus, motion of the carriage causes the lever arm to rotate, which in turn rotates the pivot pin in the slot driving the upper block of the compound tool rest. A guide bar restricts the end of the lever arm from moving longitudinally with respect to the lathe bed.

The device can also be used for other tasks that include taper and contour cutting; and by hand control of the adjustable lever arm, special rapid, short-pass cuts can be made. Taper and contour cutting is achieved by setting the compound tool rest transversely to the lathe. Control of the lever arm then with a straight guide bar set at an appropriate angle to the lathe axis will result in a predetermined taper being cut. Contour cuts are made possible with appropriate templates in place of the guide bar.

One object of the present invention is to adapt existing lathes having standard screw thread settings for cutting extra nonstandard threads.

Another object of the present invention is to provide an adapter for cutting extra non-standard threads automatically.

Yet another object of the present invention is to provide an adapter which may be easily and quickly attached to existing lathes to set the lathe for cutting threads at any settings between standard settings.

Still another object of the present invention is to provide a device which can be utilized for contour cuttings.

Still another object of the present invention is to provide a device which can be used for cutting predetermined tapers.

Another object of the invention is to provide a means for making rapid, short-pass lathe cuts by an adjustable mechanical advantage hand control.

Still another object of the present invention is to provide an adapter for cutting extra non-standard threads which when set is automatically operated by the lathe carriage drive.

Yet another object of the present invention is a device for adapting lathes for cutting extra non-standard threads by driving the upper block of a compound tool rest a predetermined incremental amount with respect to the motion of the entire carriage.

Other objects, advantages and novel features of the present invention will become apparent from the following detailed description of the invention when considered in conjunction with the accompanying drawings wherein like reference numbers identify like parts throughout.

BRIEF DESCRIPTION OF THE DRAWINGS

FIG. 3 is a sectional view taken at 3—3 of FIG. 1.

FIG. 6 is a schematic diagram illustrating the principal operation of the invention.

FIG. 7a and FIG. 7b graphically illustrate the operating principle of the invention.

FIG. 8 illustrates a modified version of the invention in semi-schematic form for cutting tapers or contours.

FIG. 9 is a graph illustrating the geometry of the taper cutting embodiment of FIG. 8 FIG. 10 illustrates a modification of the taper cutting embodiment of FIG. 8 for precision cutting of tapers.

FIG. 11 illustrates a variation of the tool rest movement mechanism of FIG. 1.

FIG. 12 is a partial section taken at 12—12 of FIG. 11.

DETAILED DESCRIPTION OF THE PREFERRED EMBODIMENT

Figure 1:
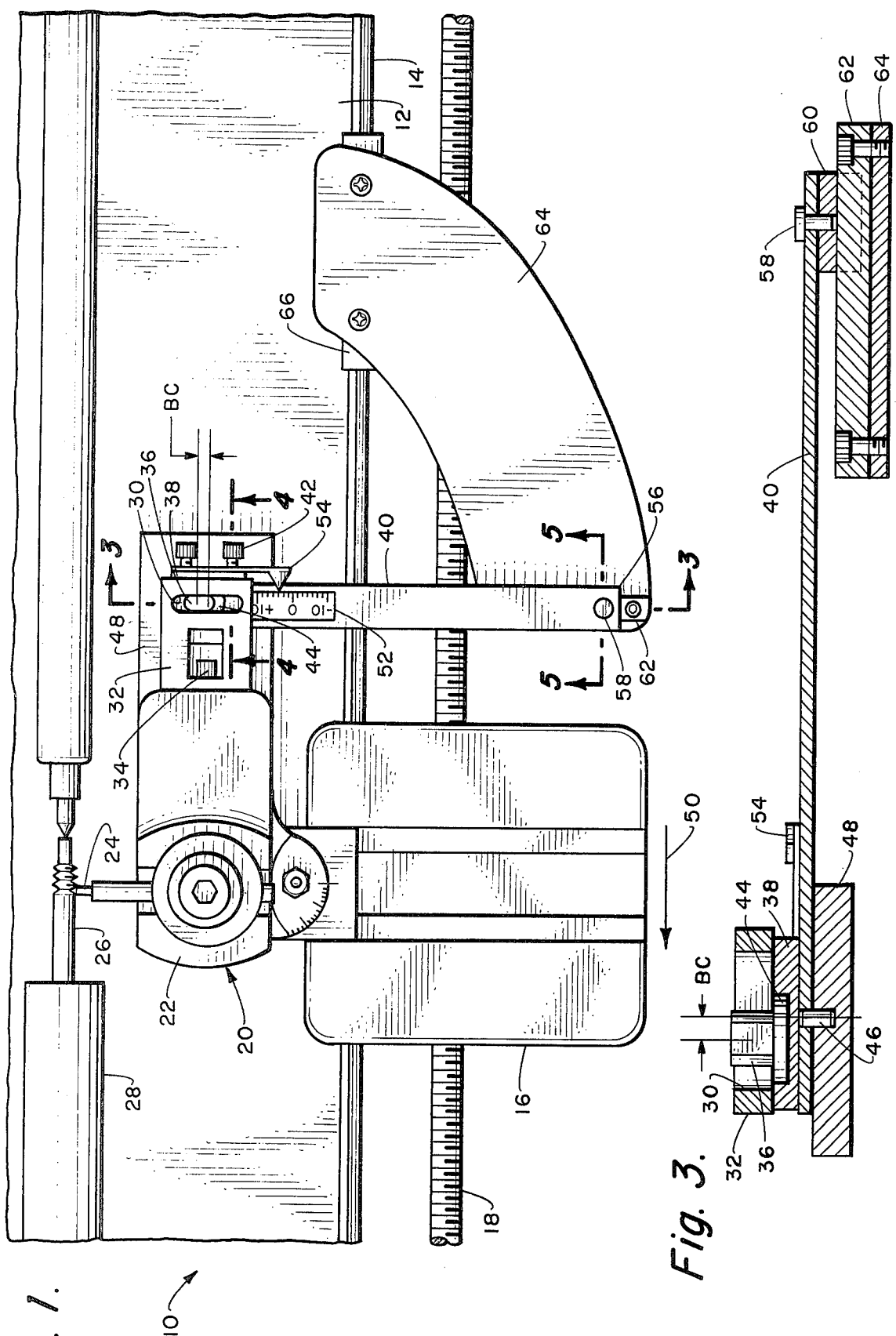
FIG. 1 is a partial top view of a lathe with the carriage and compound tool rest.

The invention is generally shown in FIG. 1 in which only a portion of a standard screw cutting lathe indicated generally at 10 is shown, having a bed 12, a rail 14 and a carriage 16 driven by a lead screw 18. The lead screw 18 is driven by a motor and gear assembly (not shown).

Above the carriage 16 is a compound tool rest 20 having a lower block essentially attached to the carriage 16 and an upper block 22 slideably attached to the lower block. The upper block 22 of the compound tool rest supports a tool holder and tool 24 for cutting a workpiece 26 mounted in the lathe chuck 28.

To cut a particular standard thread a gear system on the lathe is adjusted by the operator. The gear box or change gears, however, do not offer any method of cutting threads between the standard settings that are provided. For example, there are standard settings for machining 32, 36, 40 and 44 threads per inch, among others, but there are no settings for any thread counts between these values. The thread settings given are merely illustrative and these lathes typically have thread settings from as coarse as four threads per inch up to as fine as 224 threads per inch in small increments, such as 4, 5, etc., at the coarse end and large increments, such as 208, 216 and 224 at the fine end. In order to machine threads having values between the standard setting an adapter which modifies the lathe was conceived. It was determined that between each standard thread setting a difference of no more than 20% is provided in the gear box, which means that an adapter that can increase or decrease the standard settings by 10% would provide sufficient overlap to machine any thread between these settings. It was realized that threads per inch can also be expressed by its reciprocal as lead in inches or millimeters and an adapter can be provided which will increase or decrease the lead corresponding to the number of threads per inch selected. Conversely, for a particular lead required, the threads per inch can be calculated and the nearest thread per inch setting on the lathe used. For example, if one wished to machine 39 threads per inch, he may utilize the standard thread setting of 40 threads per inch, which corresponds to 0.0250 inches of lead. For 39 threads per inch a lead of 0.02564 inches is required. Therefore, we must add 0.00064 inches of lead to the standard setting of 40 threads per inch.

This was accomplished by providing an adapter tool illustrated in FIG. 1, which will move the upper block 22 of compound tool rest 20 an incremental amount proportional to the movement of the entire carriage 16 and compound tool rest 20. Thus, for machining 39 threads per inch, the upper block 22 of the compound tool rest 20 would be moved a proportional amount of the entire carriage 16 equal to 0.00064 inches per 0.0250 inches of movement of the entire carriage 16. This is accomplished by the use of a transverse slot 30 in a block 32 fastened to the upper block 22 of the tool rest by a screw 34. Engaging the slot 30 is a pivot pin 36 which is adjustable along the slot by a regulator block 38 adjustably secured to a lever arm 40. Screws 42 clamp the regulator block 38 to the lever arm and permit adjustments of the pivot pin 36 which is supported in a socket 44 in the regulator block 38. When the center of the pivot pin 36 is in the approximate geometrical transverse center of the slot 30 and is precisely coaxial with pin 46 in FIG. 3, movement of the lever arm 40 will not impart any movement to the upper block 22 holding the cutting tool 24. However, when the regulator block 38 and pin 36 are slightly displaced from the center of pin 46, a moment arm BC is produced which will move the upper block of the compound tool rest a predetermined incremental amount simultaneously with the movement of the carriage 16. This movement is produced by rotational movement of the lever arm 40 which is supported by a pin 46 (FIG. 3) engaging a base plate 48 attached to the lower block of the compound tool rest 20. The length of the moment arm BC is calculated to provide a linear movement in the direction indicated by arrow 50 equal to the amount of lead being added to (or subtracted from) the standard thread setting. Thus, for the exampe of 39 threads per inch given above, the moment arm BC would be adjusted to provide 0.00064 inch addition to the lead for 40 threads per inch.

In order to quickly set the amount of lead into the tool adapter, a calibrated scale 52 is mounted on the lever arm 40 having a center O position. A pointer 54 indicates the relative position of the regulator block 38 (and hence the pivot pin 36) for adding or subtracting a predetermined amount of lead. The scale 52 may be calibrated to provide up to a 10% (or more) addition or subtraction in increments as small as one one hundredths of one percent. Thus, for a setting of, say, plus 1.01 on the calibration scale, there would be a 1.01% addition to the standard lead set into the lathe. The arrangement of scale 52 and pointer 54 is preferred, but could be reversed and, of course, a vernier scale could be provided for very fine adjustments.

Now referring back to the previous example of 39 threads per inch, which means an addition of 0.00064 inches to the lead for 40 threads, corresponding to an increase of approximately 2.56%, which means the pointer 54 would be set up +2.56 on the part of the scale calibrated to read from 0 to +10. This means the thread tool adapter would add 2.56% to the lead for 40 threads per inch resulting in a machine cut of workpiece 26 of 39 threads per inch.

The lever arm 40 is operated automatically by movement of the carriage 16 being driven by feed screw 18. This is accomplished by securing end 56 of lever arm 40 to a guide bar 62 by means of a third pivot pin 58 and a swivel 60 riding on the guide bar 62. As the carriage 16 moves in the direction indicated by arrow 50, the lever arm 40 begins to automatically rotate, driving the upper block 22 by means of the moment arm BC. This is illustrated more clearly in FIG. 2 after some movement of the carriage 16 has occurred beyond the position of FIG. 1. The lever arm 40 is now moved from a transverse position to a slightly angled position, and the swivel 60 has maintained a properly fixed reference with the lathe bed 12 and rail 14 by sliding on guide bar 62. Of course, if the carriage 16 had moved oppositely from the direction indicated by arrow 50, lever arm 40 would be angled to the right, still controlling block 22 by means of moment arm BC.

Only when the pivot pin 36 is coincident with the axis of pivot pin 46 would the length of moment arm BC be 0 and there would be no variation from the standard thread set in the gear box.

Figure 5:
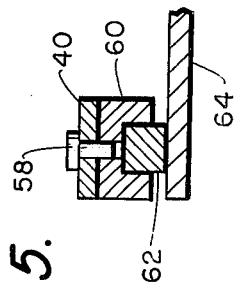
FIG. 5 is a sectional view taken at 5—5 of FIG. 1.
Figure 4:
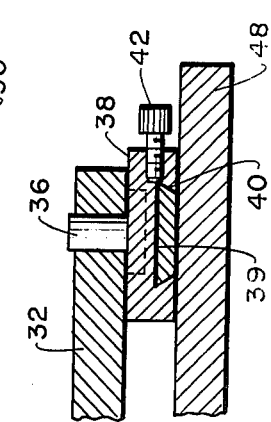
FIG. 4 is a sectional view taken at 4—4 of FIG. 1.

The attachments and adjustment of the lever arm 40 and regulator block 38 is illustrated in sectional views FIGS. 4 and 5. In FIG. 4 the regulator block 38 is secured to the lever arm 40 by a dovetailed slot 39 in the regulator block permitting the regulator block to be adjusted by loosening of screws 42. When the pointer 54 is set to the proper value on calibration scale 52, the regulator block is then locked by the screws 42. This adjusts the position of the pivot pin 36 in the slot 30, as was described above. The opposite end of the lever arm 40 is secured to the guide bar 62 by the slot in swivel 60 which in turn is held by pin 58 to the lever arm 40. As the carriage 16 moves, the lever arm 40 begins to rotate which in turn rotates the regulator block 38 causing movement of the upper block 22 by the pivot pin 36 offset (i.e. moment arm BC) from the geometric center of pin 46.

The principle of operation of the device is illustrated in FIGS. 6, 7a and 7b. In FIG. 6 the tool is schematically represented at 24 as being attached to the tool rest upper block 22 being driven by the block 32 having the slot. The pivot pin 36 is illustrated as being at position C with the pivot pin 46 being indicated as at the position labelled B. The lever arm is indicated by the line 40 having a second pivot point 58 attached to the swivel 60 represented by point A. The guide bar is represented by reference line 62.

As can now be seen with referencce to FIG. 7a, movement of the carriage 16 to the left has displaced point B in the same direction a like amount. With point A restrained to lie on the reference line 62, the lever arm 40 can also be considered to have rotated about point B in the direction indicated by arrow 70. Moment arm BC (illustrated also in FIGS. 1, 2 and 3), treated as an extension or part of arm 40, has also rotated about point B and carried point C to the position shown by FIG. 7a. Dotted line 72 represents the line of travel of the carriage. As can be seen from FIG. 7a, the movement of the carriage a distance AD results in a movement of the upper block through the action of moment arm B an additional distance DE. In order to determine the length of moment arm BC required for movement DE, the following equation for similar triangles ABD and ACE can be written:

$$AE/AD = AC/AB \quad (1)$$

$$AC = AE \times AB/AD \quad (2)$$

where:
AE = tool travel
AD = carriage travel
AC = AB±BC, BC = AC−AB or BC = AB−AC
AB = Length of arm 40, pin 46 to pin 58

As can be seen from this figure, AD can represent the lead corresponding to the standard screw thread setting at the gear box. For example, for 40 threads per inch, the distance AD would be 0.0250 inches. Also, the distance AB is designed to remain constant and is the length of the lever arm 40 from pin 58 to pin 46. To determine the distance AE, we find how much lead must be added (or subtracted) from the standard thread we have set at the gear box. In the example given above, this would mean that AE would be equal to the lead for 39 threads per inch. This means AE is equal to 0.02564 inches. We may now determine AC from equation 2 and adjust point C (pivot 36) a predetermined calibrated amount on scale 52 to produce the moment arm BC.

Figure 2:
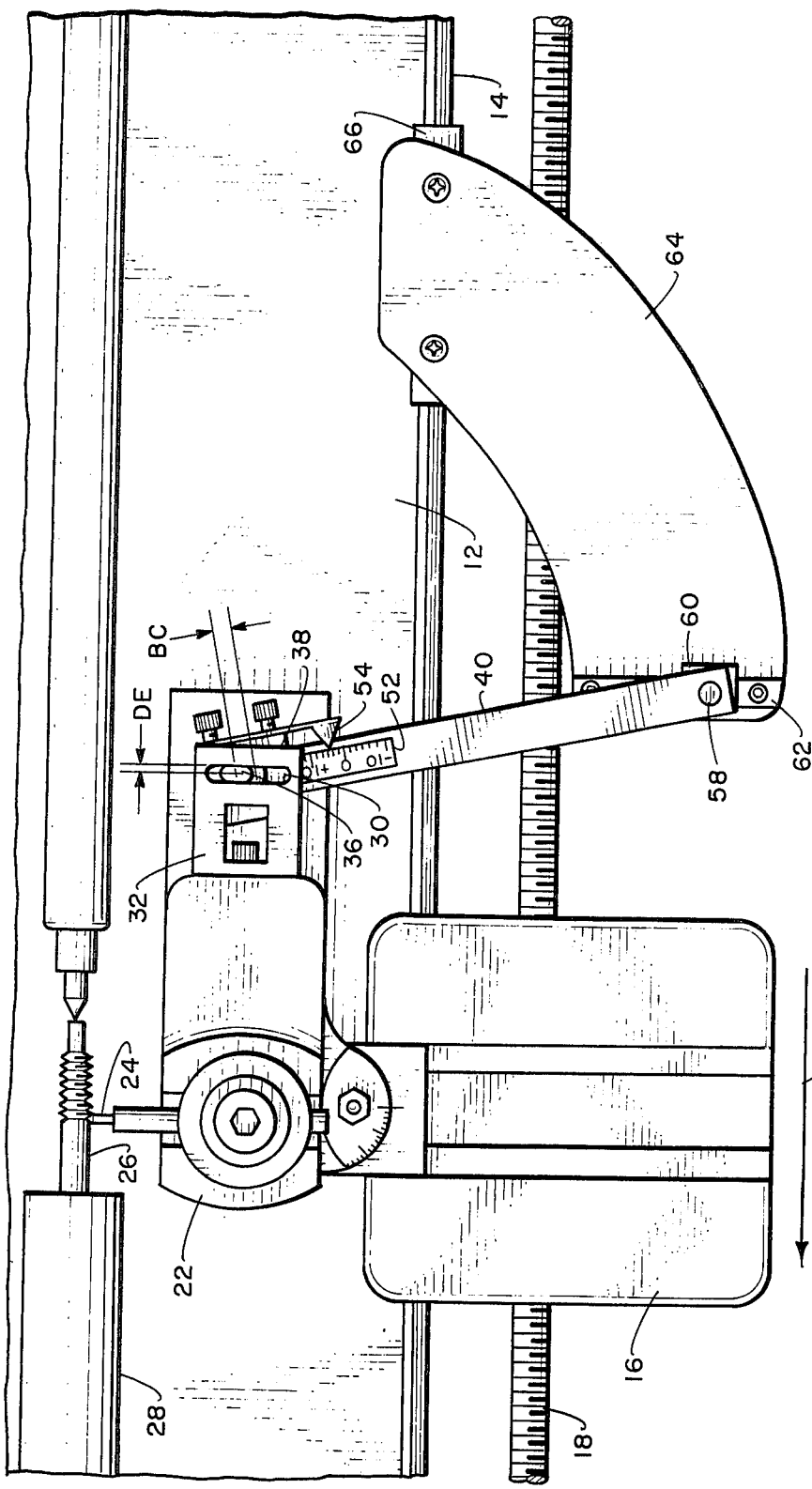
FIG. 2 is identical with FIG. 1 illustrating movement of the carriage and operation of the invention.

In certain cases, we may want to subtract lead from the standard setting rather than to add it, and for that purpose the regulator block would be set to produce a condition as shown in FIG. 7b. With the pivot pin 36 set at point C, the net tool travel AE can now be seen to be less than the carriage travel AD. For example, for a thread requirement of 41 threads per inch, we would wish to subtract 0.00061 inches (2.44%) froam the 40-thread lead, which means we would adjust the regulator block 38 to bring pointer 54 on the scale 52 to the opposite side of the 0 point from that which produces a condition as shown in FIGS. 1 and 2 (i.e. moment arm BC).

Thus, by adjusting the pivot pin 36 to a position on either side of 0 position (point B) an amount up to plus or minus 10% may be added to or subtracted from the standard thread setting, permitting any size thread between the standard settings to be machined. While provision for up to 10% change in lead is provided for and is enough for usual conditions, there may be cases where a greater change is needed. Extending the device for greater leads can easily be done by simple modifications to the scale and adapter. The 10% value was chosen because in most cases it covers the entire range standard settings with some overlap.

An alternative construction of the movement mechanism for driving the upper block of the compound tool rest is illustrated in FIGS. 11 and 12. The block 132 is attached to the upper block 22 of the compound tool rest by a screw 34 as before, but has a rectangular slot 130 which must now accomodate an added bearing block 102. The pivot pin 36 has been replaced with a straight pin 100, pressed into the regulator block 138 and engaging the bearing block 102. The pin rotates with the regulator block 138 and rotates within the bearing block 102 engaging the slot 130. In this arrangement, regulator block 138 and pin 100 rotate with the arm 40, causing movement of the bearing block 102 to impart movement to the upper block 132 by force against the side of the rectangular slot 130. The upper block 132 then imparts the movement to the compound tool rest. Of course, it should be recognized that the pin 100 can, if desired, be an integral part of the regulator block 138.

With slight modifications this thread cutting tool can also be used for cutting tapers or contours. This is in addition to the unique feature of permitting the lever arm 40 to be disengaged from the guide bar 62 and hand-operated to make special rapid, short-pass cuts, if desired. The tool adapter may be easily modified, as shown in FIG. 8, to cut tapers by providing an angled guide bar 76 adjustably mounted on a plate 78 attached to a rail clamp 80 as before. The plate could be perforated with a series of regularly spaced holes 82 to make it convenient for securing an angled bar 76 for taper cutting or a more irregular template for contours. A drawing or scribed marks could be made on plate 78 to assist in setting the bar 76, if desired. One or more rollers could be used to contat the bar or template in place of the swivel 60.

In this mode of operation, the lathe is not normally set for cutting threads unless taper threads are desired. A spring may be provided at the tool rest for taking up "lost motion" in the tool control system. With the lever arm 40 now roughly parallel to the lathe axis, the tool 24 produces a taper cut on a workpiece 86, the slope of which will be approximately the slope of the angle $\theta$ that the guide bar makes with the lathe axis divided by the lever ratio $AB/BC$.

$$So \ \theta = tan^{-1}(T \times R) \quad (3)$$

Where
$T$ = Required taper in inches per inch along one side
$R$ = Lever ratio = $AB/BC$ This simple modification would be quite adequate for rough cutting some tapers. However, due to the rotational movement of the lever arm 40, a small error, sufficient enough to preclude use for precision tapers, would be introduced, as illustrated in FIG. 9. The carriage movement is represented by arrow 88 and the lever arm by line 40. The swing of lever arm 40 as the carriage travels and point A follows the guide bar indicated at 76 can result in a longitudinal error indicated at 90. The associated transverse error, although reduced by at least 10 to 1 at the tool can still be appreciable and may be unacceptable for some precision grade standard tapers.

Therefore, to compensate for this error and to allow the taper cutting mode to be upgraded in quality when required, a modification is illustrated in FIG. 10 may be provided. A plate 90, maintained parallel to the lathe axis, is arranged to slide securely on the guide bar 76 and to support the end of the lever arm 40 so that point A is constrained to move only in the longitudinal direction with respect to the plate 90. A link arm 92 pivoted at point 94 (in longitudinal alignment with point A) on the plate 90 and at point 96 on the lever arm 40, by causing point A to be continuously re-positioned along the plate 90 as the carriage moves, will provide the necessary compensation when correctly proportioned to the system.

As an example, if the following dimensions were chosen, calculations shown that all standard self-holding tapers from the smallest sizes up to ASA #500 could be produced with a transverse tool error of less than 50 micro-inches:

$M$ = distance from point B to point 96 = 9 inches
$N$ = distance from point 94 to point 96 = 1.051 inches
$P$ = distance from point A to point 96 = 3 inches
Moment Arm $BC$ = distance from point B to point C = 1 inch $R$ = lever ratio = $AB/BC$ = 12

Thus: $P/N = K = 2.854424$ \quad (4)

The error is least for the smallest taper and increases with taper length and slope. Almost any order of correction needed may be attained by consideration of the geometry and the following equation derived therefrom:

Transverse tool error = [M versine$\beta$ - N versine sin$^{-1}$(K sin$\beta$)] tan $\theta$ \quad (5)

Thus there has been disclosed a device for cutting extra non-standard threads which is readily adaptable for many existing thread cutting lathes. The device provides a method of moving the upper block of the compound tool rest simultaneously with and in proportion to the motion of the bottom block of the tool rest attached to the carriage. The particular device shown can be, of course, incorporated into the tool rest itself rather than attachable thereto. Or a complete assembly consisting of tool rest, slide, and essential parts as already herein described, can be provided as a unit for clamping directly into the compound tool rest of a lathe. Further, the lever arm and the guide bar can be attached at various fixed positions on the lathe and the particular position shown was believed to be the most convenient. In addition, the device can be used for cutting tapers, contours or irregular figures by use of a modification or by hand operation. When in the taper cutting configuration illustrated in FIGS. 8 through 10, the device can also be used to cut tapered threads by setting the machine for cutting some standard thread size and then utilizing the taper cutting modification.

Obviously, many modifications and variations of the present invention are possible in light of the above teachings. It is therefore to be understood that the full scope of the invention is not limited to the details described herein and may be practiced otherwise than as specifically described.

What is claimed is:

1. An apparatus for adapting a lathe to cut extra non-standard thread sizes, comprising:
    a carriage attached to said lathe bed;
    a lead screw for driving said carriage along the lathe bed;
    a compound tool rest attached to said carriage for supporting a cutting tool;
    said compound tool rest having a lower block attached to said carriage and a tool-supporting upper block, movable and supported by said lower block;
    thread-selecting means for setting said lathe to cut a predetermined standard thread;
    movement means for moving said upper block a predetermined amount relative to said lower block when said lower block is being driven by said carriage,
    whereby a predetermined amount may be added to or subtracted from the lead selected by said thread-selecting means.

2. The apparatus according to claim 1 wherein said movement means may be set to add or subtract 10% of the lead selected by said thread-selecting means.

3. The apparatus according to claim 1 including:
    drive means for driving said upper block;
    linkage means linking said drive means to be fixed point on said lathe whereby said drive means is automatically driven when said carriage moves.

4. The apparatus according to claim 3 wherein said drive means comprises:
    a drive block having an elongate transverse slot detachably secured to said upper block; and
    adjustable moment arm means engaging said slot.

5. The apparatus according to claim 3 wherein said linkage means comprises:
    a guide bar secured to said lathe bed;
    a lever arm rotatably secured to said guide bar; and
    connecting means connecting lever arm to said drive means.

6. The apparatus according to claim 4 wherein said adjustable moment arm comprises:
    a pivot pin, movable and engaging said slot; and regulator means for regulating the position of said pivot pin in said slot and along the lever arm for preselecting the length and direction of said moment arm.

7. The apparatus according to claim 6, wherein said regulator means includes:
calibration means for calibrating the moment arm selected by said regulator means to add or subtract ten percent of the value of the lead set by said thread selector.

8. The apparatus according to claim 6 wherein said pivot pin is rotatably supported in a socket on said regulator means.

9. The apparatus according to claim 8 including:
a lever arm rotatably supporting said regulating means.

10. The apparatus according to claim 9 wherein said regulating means comprises:
a block slideably secured to said lever arm.

11. The apparatus according to claim 10, said calibration means comprising:
a scale on said lever arm; and
a pointer secured to said regulator block for indicating the relative position of said regulator on said lever arm.

12. The apparatus according to claim 11 wherein said linkage means includes:
said lever arm;
a guide bar rigidly supported on said lathe; and
rotating means rotatably securing the end of said lever arm opposite said regulator block to said guide bar.

13. The apparatus according to claim 12 wherein said rotating means comprises a swivel riding on said guide bar.

14. The apparatus according to claim 13, including:
a base plate detachably secured to the lower block of said tool rest; and
a lever arm pivot pin rotatably securing said lever arm and regulator to said base plate.

15. In a lathe having a carriage for driving a compound tool rest consisting of an upper block and a lower block, a lead screw for driving said carriage, and means for setting said lathe for cutting standard thread sizes, the improvement comprising:
drive means for driving said upper block a predetermined incremental amount independent of and proportional to the movement of said carriage whereby said lathe may be set to cut threads any size between said standard settings.

16. The apparatus according to claim 15, wherein drive means is comprised of:
an adjustable moment arm linking said upper block to a fixed point on said lathe whereby movement of said carriage causes said moment arm to move said upper block a predetermined proportional amount relative to said carriage.

17. The apparatus according to claim 16 wherein said moment arm comprises:
a rotatable lever arm;
regulator block means slideably secured on said lever arm;
pivot pin means pivotally connecting said regulator block to said upper block;
whereby the regulator block may be slideably adjusted to increase or decrease the distance between said pivot pin and the axis of rotation of said lever arm thereby adjusting the length of said moment arm.

18. The apparatus according to claim 17 including rotating means for rotating said lever arm.

19. The apparatus according to claim 18 wherein said rotating means comprises:
a guide arm rigidly attached to said lathe; and
swivel means connecting said guide arm to said lever arm whereby movement of said carriage causes rotation of said lever arm.

20. The apparatus according to claim 17 wherein said regulator block may set the moment arm to add or subtract ten percent of the lead determined by said standard thread set.

21. The apparatus according to claim 5 including:
interchanging means for interchanging said guide bar whereby said upper block may be controllably moved to machine a variety of contours.

22. The apparatus according to claim 21 wherein said interchangeable means comprises:
a guide arm secured to a rail of the lathe bed; and
said guide bar being secured to said guide arm at an angle substantially transverse to the axis of said cutting tool whereby said cutting tool may be used for cutting coarse tapers in a workpiece.

23. The apparatus according to claim 22 wherein said guide arm has a plurality of mounting holes whereby the position and angle of the guide bar may be changed to vary the taper to be cut.

24. The apparatus according to claim 23 including:
compensation means for compensating for stuctural error of said lever arm whereby precision tapers may be cut.

25. The apparatus according to claim 21 wherein said interchangeable means comprises:
a guide arm secured to said lathe bed; and
a template being secured to said guide arm and having a variety of contours according to the varying shape to be cut.

* * * * *

UNITED STATES PATENT OFFICE
CERTIFICATE OF CORRECTION

Patent No. 4,092,884    Dated  June 6,1978

Inventor(s) Ellwood J. King

It is certified that error appears in the above-identified patent and that said Letters Patent are hereby corrected as shown below:

Column 1, line 58, change "are" to --arm--.

Column 4, line 28, change "exampe" to --example--.

Column 5, line 49, change "arm B" to --arm BC--.

Column 6, line 15, change "froam" to --from--.

Column 6, line 67, change "contat" to --contact--.

Column 7, line 29, change "is" to --as--.

Column 7, line 42, change "shown" to --show--.

Column 7, lines 62 and 63, change equation "(5)" to

--Transverse tool error = [M versine $\beta$ - N versine $\sin^{-1}$(K sin$\beta$)] tan $\theta$/R--

Column 8, line 51, change "to be fixed" to --to a fixed--.

Signed and Sealed this

Second Day of January 1979

[SEAL]

Attest:

RUTH C. MASON
*Attesting Officer*

DONALD W. BANNER
*Commissioner of Patents and Trademarks*